2,827,463
Patented Mar. 18, 1958

2,827,463

WERNER COMPLEXES OF 4-ETHYL PYRIDINE

William D. Schaeffer, Berkeley, Calif., assignor to Union Oil Company of California, Los Angeles, Calif., a corporation of California No Drawing. Application November 4, 1954
Serial No. 466,938

5 Claims. (Cl. 260—270)

This invention relates to a new class of complexes of the Werner type wherein a divalent metal salt is coordinated with an organic nitrogen base. More specifically, the divalent metal salts are those of the metals manganese, iron, cobalt and nickel, wherein the anion is monovalent. The organic nitrogen base with which the metal salt is coordinated is 4-ethyl pyridine. The new complexes may be designated by the general formula:

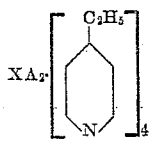

wherein X is manganese, iron, cobalt or nickel, and A is a monovalent anion.

The new complexes are useful as selective clathrate-formers for separating mixtures of organic compounds which are chemically and physically similar, but which differ in molecular configuration. For example, when the solid complexes are triturated with, or formed in the presence of, a liquid mixture of isomeric xylenes it is found that one xylene isomer is selectively integrated into the crystal structure, forming what is presently regarded as a "clathrate." The solid clathrate may then be separated from the liquid phase, and decomposed with acid or heat to recover the selectively clathrated hydrocarbon. The herein claimed complexes are of particular value for separating xylenes because the 4-ethyl-pyridine component boils at 166° C., and hence may be easily separated from the clathrated xylenes which boil at 139–145° C. Other nitrogen bases such as gamma picoline (B. P. 143° C.) are disadvantageous from this standpoint.

The new complexes may be easily prepared by simply admixing the proper mole-ratios of metal salt and 4-ethylpyridine, normally at room temperatures, although higher or lower temperatures may be employed. If desired the metal salt XA$_2$ may be first dissolved in a solvent such as water, and the complex precipitated by addition of 4-ethylpyridine. The actual final mole-proportion of 4-ethylpyridine in the solid complex may vary somewhat, but those containing substantially four moles per mole of salt are preferred.

Suitable metal salts include the halides, nitrites, nitrates, thiocyanates, isothiocyanates, cyanides, azides, cyanates, isocyanates, formates, acetates, and the like. Specific examples of such salts are:

Nickelous chloride
Nickelous nitrite
Nickelous thiocyanate
Manganous chloride
Manganous cyanide
Cobaltous bromide
Cobaltous acetate
Ferrous thiocyanate
Ferrous cyanate When working in aqueous solution, it is not essential to employ the actual salt desired in the final complex; the desired salt may be formed in situ by metathesis during the formation of the complex, as for example:

$$FeSO_4 + 2NaSCN \rightarrow Fe(SCN)_2 + Na_2SO_4$$

The Fe(SCN)$_2$ forms a less soluble complex with the added 4-ethylpyridine than does the FeSO$_4$, and hence the above equation is driven substantially to completion, with formation of the highly insoluble ferrous thiocyanate complex. Where the desired complex is more soluble in water, other solvents may be employed, or the complex may be prepared in the dry state, as by passing vapors of 4-ethylpyridine over the desired metal salt. Many other methods of preparation will be apparent to those skilled in the art.

Examples

The invention is further illustrated, but is not limited, by the following technique which was utilized for preparing a series of the herein described complexes. The general technique was as follows:

(1) A concentrated aqueous solution A was prepared containing one mole-proportion of the desired metal ion and two mole-proportions of the anion desired in the final complex. In some cases heating was employed to obtain complete solution.

(2) A second concentrated aqueous solution B was prepared, containing four mole-proportions of 4-ethylpyridine.

(3) Solutions A and B were mixed.

(4) The mixture was cooled if necessary to precipitate the complex.

(5) The precipitated mixture was filtered, and the precipitate washed with water.

(6) The washed product was dried to constant weight in an air stream at 24–100° C. The yields were substantially theoretical. The materials employed to furnish the desired metal ions and anions in solution A were as follows:

| Metal ion | Anion | Material employed |
|---|---|---|
| manganous | | manganous chloride. |
| ferrous | | ferrous sulfate. |
| nickelous | | nickelous chloride. |
| cobaltous | | cobaltous chloride. |
| | formate | formic acid. |
| | cyanide | sodium cyanide. |
| | chloride | manganous chloride. |
| | cyanate | sodium cyanate. |
| | thiocyanate | sodium thiocyanate. |

The complexes so prepared and some of their properties are as follows:

| Complex | Formula | Color | Melting Point, °C. | Elemental analysis, Wt. Percent ||||
|---|---|---|---|---|---|---|---|
| | | | | Calculated || Found ||
| | | | | C | N | C | N |
| 1. Nickel tetra-(4-ethylpyridine) diformate. | Ni(HCOO)₂·[C₂H₅-pyridine]₄ | Pale blue | 161 | 62.4 | 9.7 | 62.0 | 9.7 |
| 2. Manganous tetra-(4-ethylpyridine) dichloride. | MnCl₂·[C₂H₅-pyridine]₄ | Slightly pink | 164, d. | 60.6 | 10.1 | 60.4 | 7.2 |
| 3. Manganous tetra-(4-ethylpyridine) dicyanide. | Mn(CN)₂·[C₂H₅-pyridine]₄ | Tan | 300 | 67.3 | 15.7 | ¹ 48.9 | 17.1 |
| 4. Manganous tetra-(4-ethylpyridine) dicyanate. | Mn(CNO)₂·[C₂H₅-pyridine]₄ | Tan | 126 | 63.5 | 14.8 | 61.4 | 11.6 |
| 5. Cobalt tetra-(4-ethylpyridine) dithiocyanate. | Co(SCN)₂·[C₂H₅-pyridine]₄ | Pink | | | | | |
| 6. Manganous tetra-(4-ethylpyridine) dithiocyanate. | Mn(SCN)₂·[C₂H₅-pyridine]₄ | White | | | | | |
| 7. Ferrous tetra-(4-ethylpyridine) dithiocyanate. | Fe(SCN)₂·[C₂H₅-pyridine]₄ | Tan | | | | | |
| 8. Nickel tetra-(4-ethyl pyridine) dithiocyanate. | Ni(SCN)₂·[C₂H₅-pyridine]₄ | Blue | | | | | |

¹ Low elemental carbon indicates this complex was not completely tetra-coordinated, but was partly the di- or tri-coordinate complex.

All of the above complexes are found to exhibit selective clathrating ability for one of the xylene isomers. Complexes 1, 2, 3 and 4 selectively clathrate ortho-xylene in preference to the other isomers, while complexes 5, 6, 7 and 8 selectively clathrate the para-isomer.

In addition to their use as clathrate-formers, the complexes are also useful in other fields as e. g. insecticides, oil-soluble metal carriers, oxidation accelerators for paints and the like. Their solubility in most organic solvents, e. g. chloroform renders them useful as impregnants for intimately depositing catalytic metals on hydrophobic surfaces as e. g. activated carbon and the like. Other uses will be apparent to those skilled in the art.

This application is a continuation-in-part of my prior application Serial No. 274,647, filed March 3, 1952, and Serial No. 309,875, filed September 16, 1952.

Other specific complexes, methods of preparation and uses will readily occur to those skilled in the art. The true scope of the invention is intended to be embraced by the following claims.

I claim:

1. A tetra-coordinated Werner complex composed of four mole-proportions of 4-ethyl pyridine coordinated with one mole-proportion of a dithiocyanate of a metal having an atomic number between 25 and 28 inclusive, said complex being capable of forming a clathrate with p-xylene in preference to the other C–8 alkaryl isomers.
2. Nickel tetra(4-ethylpyridine) dithiocyanate.
3. Cobalt tetra(4-ethylpyridine) dithiocyanate.
4. Ferrous tetra(4-ethylpyridine) dithiocyanate.
5. Manganous tetra(4-ethylpyridine) dithiocyanate.

References Cited in the file of this patent

Ploquin: Compte rendus, vol. 233, pp. 162–164 (1951).
Logan: J. Am. Chem. Soc., vol. 74, pp. 5224–5 (1952).